United States Patent [19]

St-Amand

[11] Patent Number: 4,553,724

[45] Date of Patent: Nov. 19, 1985

[54] STOP COCK MANIFOLD HOLDER

[76] Inventor: Maurice St-Amand, 44 Orléans St., Vimont, Laval, Quebec, Canada, H7M 1P2

[21] Appl. No.: 555,597

[22] Filed: Nov. 28, 1983

[51] Int. Cl.[4] .................................................. F16L 3/22

[52] U.S. Cl. ...................................... 248/68.1; 248/314

[58] Field of Search .................. 248/68.1, 49, 56, 538, 248/520, 314; 403/174

[56] References Cited

U.S. PATENT DOCUMENTS 2,613,900 10/1952 Byrnie ................................ 248/68.1
3,468,508 9/1969 Huver ................................. 248/314
3,606,408 9/1971 Wagner ............................... 403/174
3,704,000 11/1972 Nelson et al. ....................... 248/538
3,791,613 2/1974 Nollen .................................. 248/49
4,223,932 9/1980 Gonsalves ........................... 403/174

*Primary Examiner*—Ramon S. Britts
*Assistant Examiner*—Ramon O. Ramirez

[57] ABSTRACT

A holder to hold and support a stop cock manifold above a floor. The holder is of solid rectangular shape having a longitudinal channel open at both ends and defining two upright side flanges. One of the flanges has a fastening means to fixedly hold the manifold in the channel. The other flange is formed with a middle opening to receive an outwardly transversely projecting ripple of the manifold. The holder is supported by a support means which can be partially disassembled for sterilization purposes.

8 Claims, 6 Drawing Figures

STOP COCK MANIFOLD HOLDER

FIELD OF THE INVENTION

The present invention relates to medical accessories, more specifically to a novel support for stop cock manifolds used, for example, in operating rooms.

BACKGROUND OF THE INVENTION

Stop cock manifolds are basically conduit relays used to direct and channel the flow of various fluids between supportive medical machinery and a patient on the operating table. Till now, the hoses connected to stop cock manifolds and the manifolds themselves have simply lain on the operating room floor or extended in mid-air, thereby constituting a physical hazard to the patient.

OBJECTS OF THE INVENTION

Accordingly, it is the gist of this invention to provide a stop cock manifold holder which will effectively and securely support at least one stop cock manifold in a readily accessible position above the floor of an operating room.

It is a corollary object of the present invention to provide a stop cock manifold holder which can be partially dismantled for sterilization purposes.

SUMMARY OF THE INVENTION

In general, the invention is comprised of a holder for a stop cock manifold, which holder is in the shape of a rectangular block having a longitudinal channel open at both ends, which is dimensionally slightly larger than the manifold body. The channel defines two upright side flanges. One of the flanges has a manifold fastening means to tightly but removably hold a manifold in place in the channel. The opposite side flange is formed with an aperture adapted to receive one of the nipples of the manifold, the nipple projecting transversely outwardly.

Support means for the holder are provided, in combination to support the latter above the floor, consisting of a rigid rod secured to the bottom surface of the holder. The rod is fixed at its lower end to a substantially horizontal rigid stem.

The latter is in turn detachably attached by an attachment means at its opposite end to an annulus. The annulus is mounted at its central hold, and preferably slidably so, to an upright post thereby supporting the entire structure of the invention above the floor.

Preferably, the annulus has detachably attached to itself two stems so that two manifolds can be supported.

BRIEF DESCRIPTION OF THE DRAWINGS

The above will be more clearly understood by having reference to the following description of the preferred embodiment illustrated by way of the annexed drawings, in which.

Like numerals indicate like elements throughout the drawings.

DESCRIPTION OF THE PREFERRED EMBODIMENT

Figure 1:
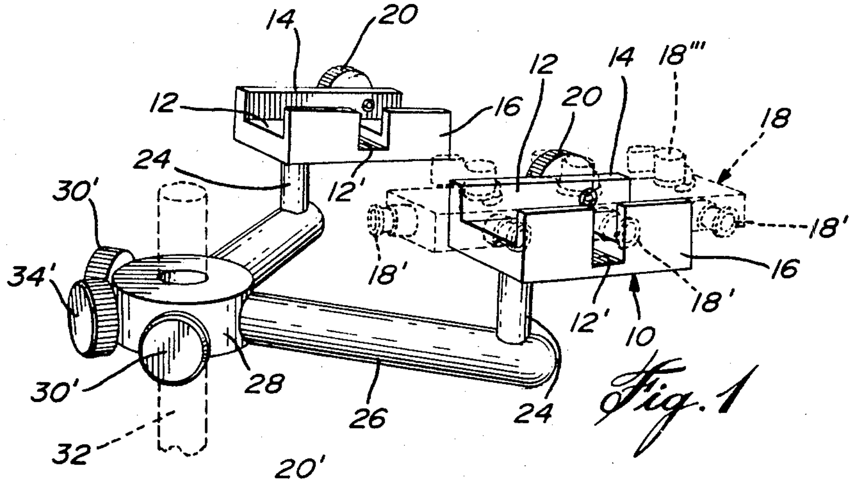
FIG. 1 is a perspective view of two stop cock manifold holders in combination with the preferred support means, also showing in phantom lines a stop cock manifold and the support post.
Figure 3:
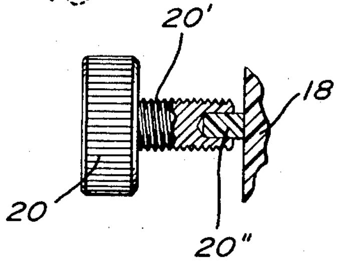
FIG. 3 is a partial plan section of the manifold body and a plan view partially sectioned of the tightening knob.

In FIG. 1 holders 10 are identical, each being in the shape of a rectangular block. A longitudinally-extending channel 12 is formed in the block, being open at both ends to allow a stop cock manifold 18 to extend longitudinally therefrom. The channel defines two upstanding flanges 14 and 16 rising from the flat floor of the channel 12.

Flange 14 is provided with a fastening means to firmly but releasably hold a stop cock manifold 18 in the holder, consisting of a tightening knob 20 formed with a transverse short shaft 20' which is threadedly engaged in flange 14. The free end of shaft 20' protrudes through the inner side of flange 14 and is fitted with a plastic pad 20'' to firmly abut the side of manifold 18 while preventing damage to the latter.

Preferably, the circumferential edge of knob 20 is serrated to afford a better grip.

Figure 2:
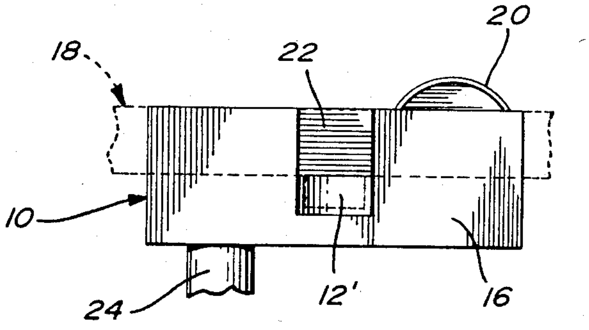
FIG. 2 is a longitudinal elevation of the holder of FIG. 1.
Figure 4:
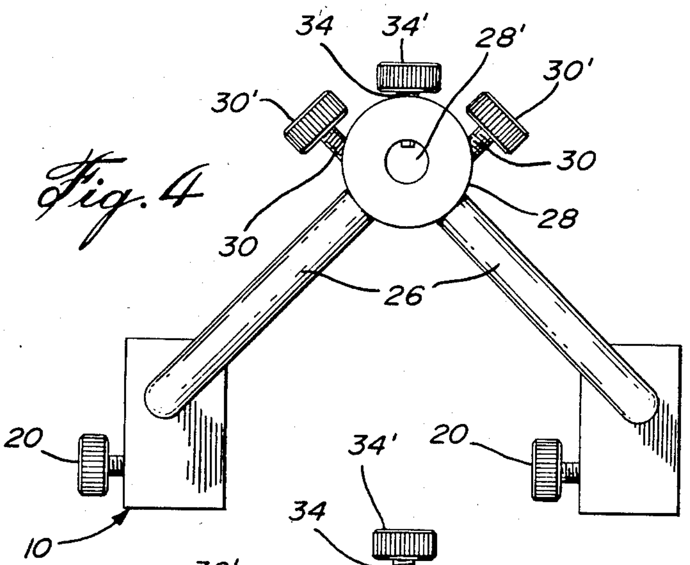
FIG. 4 is a bottom plan view of the assembly of FIG. 1.
Figure 5:
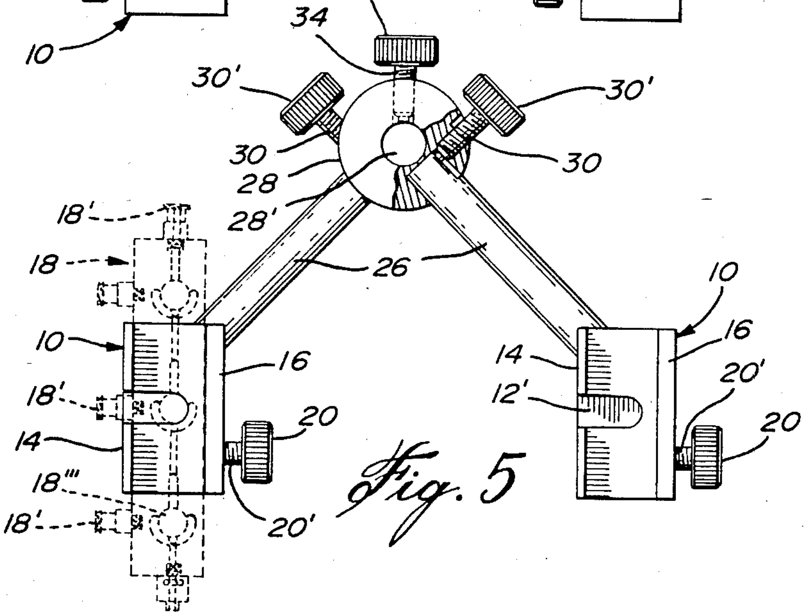
FIG. 5 is a top plan view of the same, partially cross-sectioned.
Figure 6:
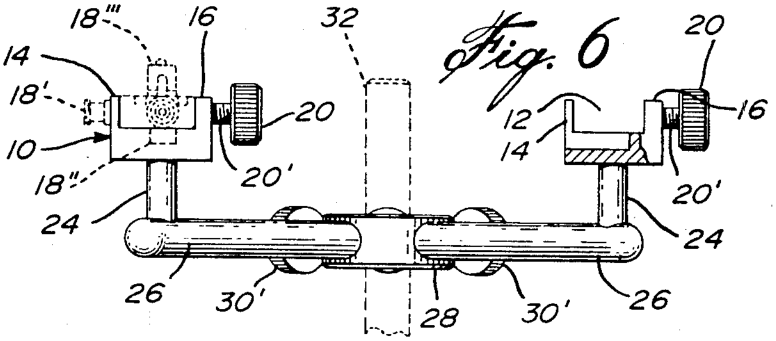
FIG. 6 is an end elevation of the assembly of FIG. 1.

The other flange 16 is provided with a middle opening 22 which is adapted to receive one of the nipples 18' of manifold 18, as best seen in FIGS. 2 and 5, opening 22 extends below the floor of channel 12 and is co-formed with a transverse groove 12' made in the floor of channel 12 to accommodate the downward protuberance 18'' of a standard stop cock 18''' of the manifold. The latter has a generally rectangular body provided with a plurality of nipples 18' and stop cocks 18''' as is known.

The support means for each holder 10 comprises a short rod 24 rigidly fixed to the bottom of the holder at one end and to a rigid horizontal stem 26 at its other end.

The inner end of stem 26 is insertable into a radial hole made in an annulus 28. The attachment means thereat consist of a tightening screw 30 threadedly extending into annulus 28 in a non-radial manner, which screw 30 tighteningly contacts stem 26. The exterior end of screw 30 has a second knob 30' which is also serrated along its circumferential edge.

The support means is completed by a vertical support post 32 adapted to extend through the central hole 28' of annulus 28. The latter is locked against post 32 by a second, radially extending, screw 34 threadedly engaged in the annulus. Screw 34 is formed at its exterior end with another knob 34' which is identical to knobs 20 and 30' to facilitate manufacture.

The figures show two holders 10 supported by annulus 28 and post 32. Obviously, there can be provided only one holder 10 or a plurality of holders 10, as desired.

I claim:

1. A holder for a medical stop cock manifold, the latter being in the shape of an elongated rectangular box; having at least one transverse nipple projecting out of the middle of one of the longer side walls thereof; the other longer side wall being free of any nipples; further having stopcocks projecting upwardly of the top wall thereof and a central protuberance extending downwardly of the bottom wall thereof; the holder comprising a rectangular block having a longitudinal channel open at both ends; said channel having a width slightly larger than the width of said box; said channel defining two spaced-apart upright longitudinal side flanges; said manifold being fittable longitudinally in said channel between said flanges; one of said flanges having a middle opening for said transverse nipple; the other of said flanges having a manifold fastening means; further comprising support means to securely and detachably support the holder above a floor.

2. A holder as defined in claim 1, wherein said fastening means is a tightening knob formed with a short transverse screw which is threadedly engaged in said other of said flanges; said screw having a free end protruding through the inner side of said other of said flanges; said free end carrying a pad firmly abutting said other longer side wall of said manifold.

3. A holder as defined in claim 1, wherein said channel has a flat floor and said middle opening extends below the flat floor of said channel and is co-formed with a transverse groove made in said flat floor of said channel to receive said protuberance.

4. A holder as defined in claim 3 wherein said manifold has three transverse nipples projecting out of said one of said longer side walls, including a middle nipple and two other nipples, one adjacent each end of said one of said longer side walls; and wherein the holder is of a length shorter than the distance between said two other nipples, whereby the latter are not obstructed by said one of said flanges.

5. A holder as defined in claim 4, wherein said support means comprises a short vertical rod rigidly fixed to the bottom of the holder at one of its ends; a rigid stem fixed at its outer end to the opposite end of said rod; an annulus having a radial hole adapted to receive the inner end of said stem; attachment means to secure said inner end of said stem to said annulus; a support post extending through the central hole of said annulus and engaging the ground at its lower end; and tightening means to removably and slidably secure said annulus to said post.

6. A holder as defined in claim 5 wherein said tightening means is a second tightening knob integrally formed with a tightening screw; the latter being radially threadedly engaged in said annulus and adapted to lock against said post.

7. A holder as defined in claim 6 wherein said attachment means consists of a third tightening knob integrally formed with a tightening screw threadedly engaged in a non-radial complementary bore made in said annulus; said bore communicating with said radial hole in which said stem is inserted and at a right angle relative thereto.

8. A holder as defined in claim 7 wherein said support means supports two holders.

* * * * *